S. S. HOGLE.
Revolving Harrow.
No. 25,736.
2 Sheets—Sheet 1.
Patented Oct. 11, 1859.
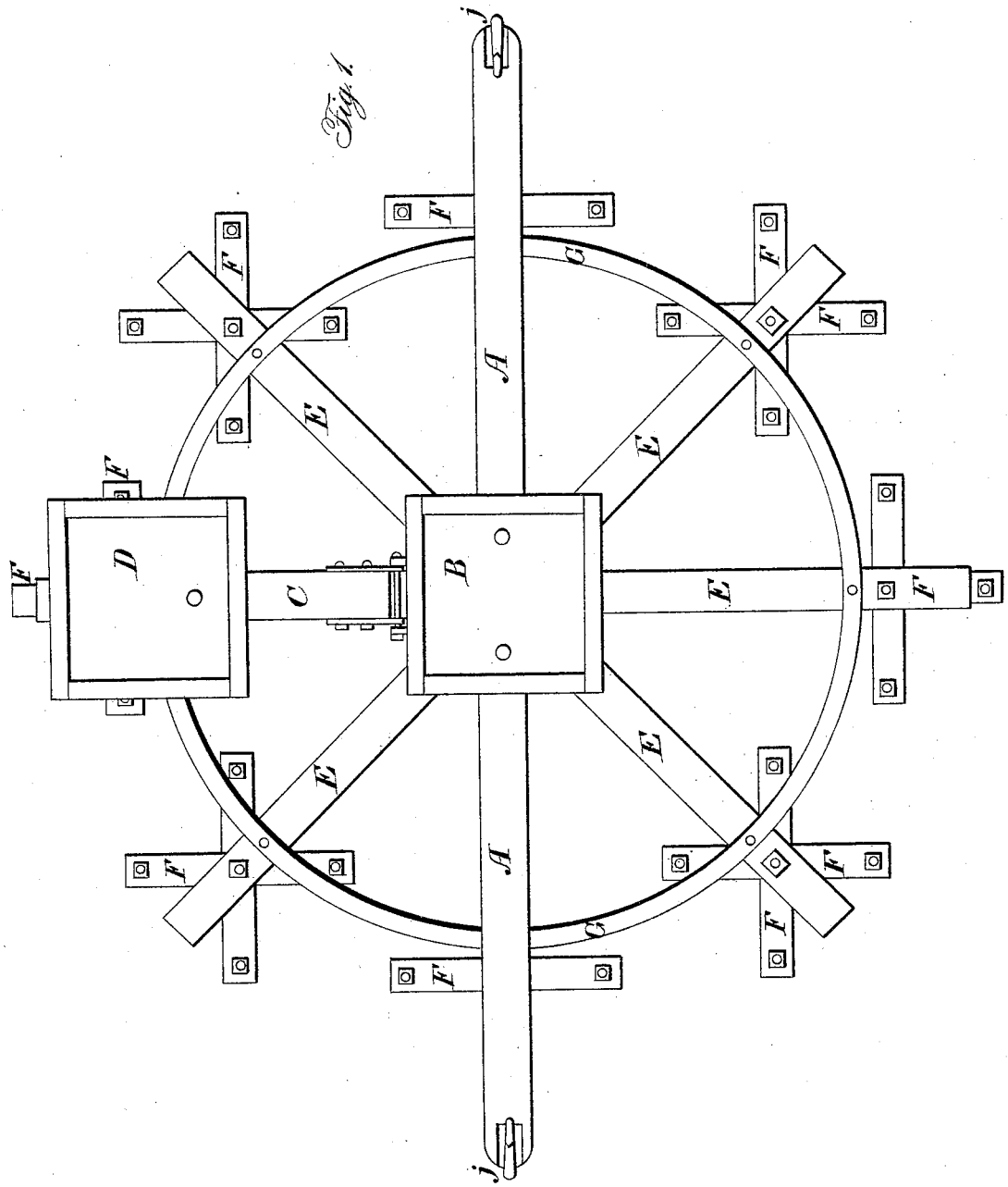
Witnesses:
R. E. Rockwell
Chas. D. Everett
Inventor:
Sidney S. Hogle

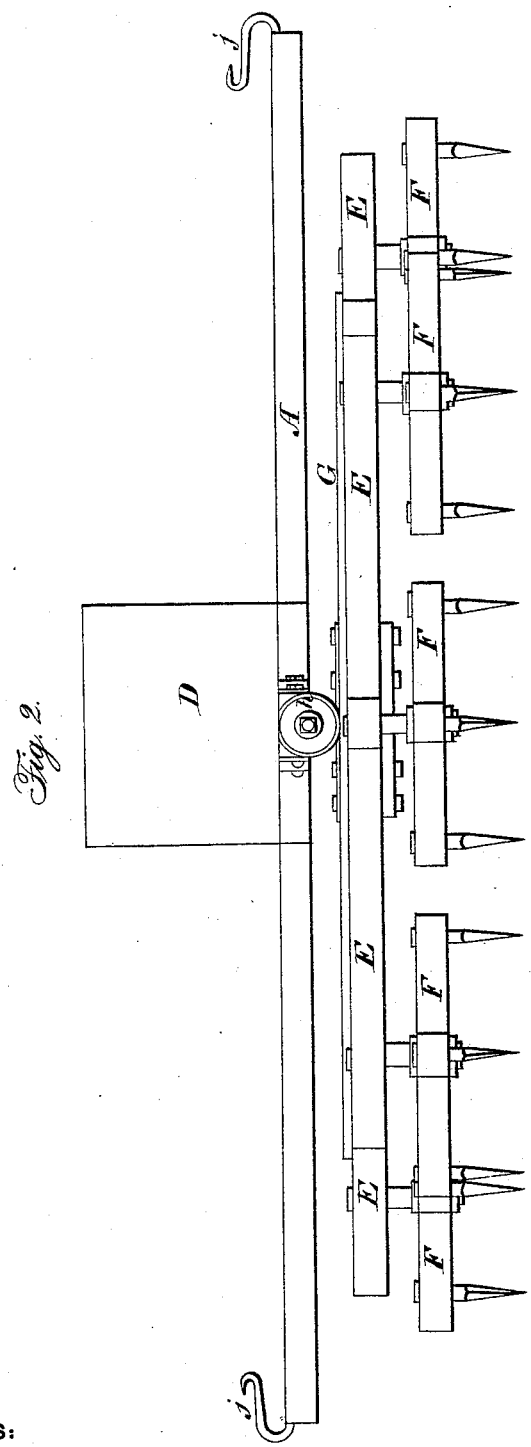

UNITED STATES PATENT OFFICE.

SIDNEY S. HOGLE, OF CLEVELAND, OHIO.

IMPROVEMENT IN ROTARY HARROWS.

Specification forming part of Letters Patent No. 25,736, dated October 11, 1859.

*To all whom it may concern:*

Be it known that I, SIDNEY S. HOGLE, of Cleveland, in the county of Cuyahoga and State of Ohio, have invented a new and Improved Rotary Harrow; and I do hereby declare that the following is a full and exact description thereof, reference being had to the accompanying drawings, making a part of this specification.

Figure 1 of the aforesaid drawings is a top view of my improved harrow, and Fig. 2 is a side view of the same.

Similar letters indicate corresponding parts in each drawings.

The principle involved in depressing one side of a horizontal harrow-toothed wheel or a harrow-toothed rotating frame for the purpose of causing the dragging movement that is given to the same to impart a positive rotary motion thereto without the aid of gearing-wheels is secured to me as my own invention by the reissue of my patent of March 17, 1857. Therefore the invention which I now desire to secure by Letters Patent consists in the production of an improved harrow by the combination of a series of rotating toothed frames, F F, with the rim or the arms of a rotating central frame, E E G, which is pivoted to a draft-beam, A, and which is depressed on one side of its axis of motion in such a manner that when the said harrow is dragged forward the said dragging movement will cause the said rotating central frame to steadily rotate upon its axis without the assistance of gearing-wheels, and by so doing it will, by a well-known law of motion, impart positive rotary movements to each of the aforesaid toothed frames that are combined therewith. It would not therefore be improper to designate this invention as "Hogle's sun-and-planet-movement harrow."

A hub of suitable shape may receive the inner ends of the radial arms E E of the rotating central frame of my improved harrow, and the outer ends of said arms may be connected with each other by bolting them to a metallic rim, G; or the said central frame of my improved harrow may be constructed in any other suitable manner. The said rotating central frame of my improved harrow must be pivoted to the draft-bar A in such a manner as allow the same to rotate freely beneath the said draft-bar.

The series of toothed frames F F may be constructed in the manner represented in the drawings, or they may be constructed in any other manner that will admit of their being freely rotated upon their axes when they are combined with the rotating central frame of my improved harrow. The said toothed frames may be furnished with harrow-teeth or with cultivator-teeth of any desired shape.

The box B, which is secured to the central portion of the draft-bar of my improved harrow, may receive the driver, or it may receive any amount of dead weight that it may be deemed advisable to place upon the harrow.

The arm C, whose inner end is hinged to the box B, carries a roller, *h*, upon a journal at the outer end of the same, which rests upon and is supported by the metallic rim G.

The box D, which is combined with the outer end of the arm C, may receive the driver, or it may contain the requisite quantity of dead weight to produce the necessary depression of one side of the harrow; or the requisite degree of depression may be given to one side of said harrow by means of a weighted lever, which may project laterally from a rigid connection either with the draft-bar or with an elongation of the main pivot-pin which passes up through the draft-bar; or the said tilting lever may be combined with both the draft-bar and an elongation of the central pivot-pin.

Rotary movements of a more positive and energetic character may be given to the toothed frames F F by causing them to rotate upon obliquely-descending pivots from the rotating central frame of my improved harrow.

Draft-hooks *j j* are secured to each end of the draft-bar A, for the purpose of enabling the rotary motion of the harrow to be at any time reversed by simply shifting the drawing-power from one end of said draft-bar to the other.

Having thus fully described my improved sun-and-planet-movement harrow, what I claim therein as my invention, and desire to secure by Letters Patent, is—

The combination of a series of individually-rotating toothed frames or wheels with a rotating central frame or wheel in such a manner that the said parts will operate substantially in the manner herein set forth.

SIDNEY S. HOGLE.

Witnesses:
R. E. ROCKWELL,
CHAS. D. EVERETT.